No. 881,283. PATENTED MAR. 10, 1908.
W. F. ARNDT & H. M. HAMILTON.
SEWING MACHINE.
APPLICATION FILED FEB. 11, 1907.

Witnesses:
Fred Palm
George Felber

Inventors:
William F. Arndt
Henry M. Hamilton
By Oliphant & Young
Attorneys

UNITED STATES PATENT OFFICE.

WILLIAM F. ARNDT AND HENRY M. HAMILTON, OF WATERTOWN, WISCONSIN.

SEWING-MACHINE.

No. 881,283.

Specification of Letters Patent.

Patented March 10, 1908.

Application filed February 11, 1907. Serial No. 356,677.

To all whom it may concern:

Be it known that we, WILLIAM F. ARNDT and HENRY M. HAMILTON, both citizens of the United States, and residents of Watertown, in the county of Jefferson and State of Wisconsin, have invented certain new and useful Improvements in Sewing-Machines; and we do hereby declare that the following is a full, clear, and exact description thereof.

The object of our invention is to provide a simple, durable and effective sewing-machine especially designed for sewing the soles of leather boots or shoes to uppers, said machine being provided with an awl feed-mechanism in conjunction with a needle and water-feed pressure-foot, whereby the leather being sewed is first moistened in the line of stitch or sole-channel, then pierced by the awl and thereafter positively fed forward under the needle, at which time said awl withdraws and retracts, permitting said needle to form the usual loop-stitch in the aperture just made by the awl. By the above combination of mechanism the needle is relieved of all strain (as is usual in this type of machine) necessary in piercing the leather, the consequence of which strain causes frequent delays and expense through breakage of said needle.

Another object of our invention is to provide means whereby the length of stitch is automatically shortened in rounding curves of the toe of a shoe-sole.

Said invention therefore consists in certain peculiarities of construction and combination of parts as hereinafter fully set forth with reference to the accompanying drawings and subsequently claimed.

Our invention, as shown in the accompanying drawings, is similar in principle and operation to the "McKay shoe sewing-machine," the various mechanical movements being accomplished by novel construction, the simplicity of which construction renders the machine less liable to wear, and more accurate and positive in its movements.

Figure 2:
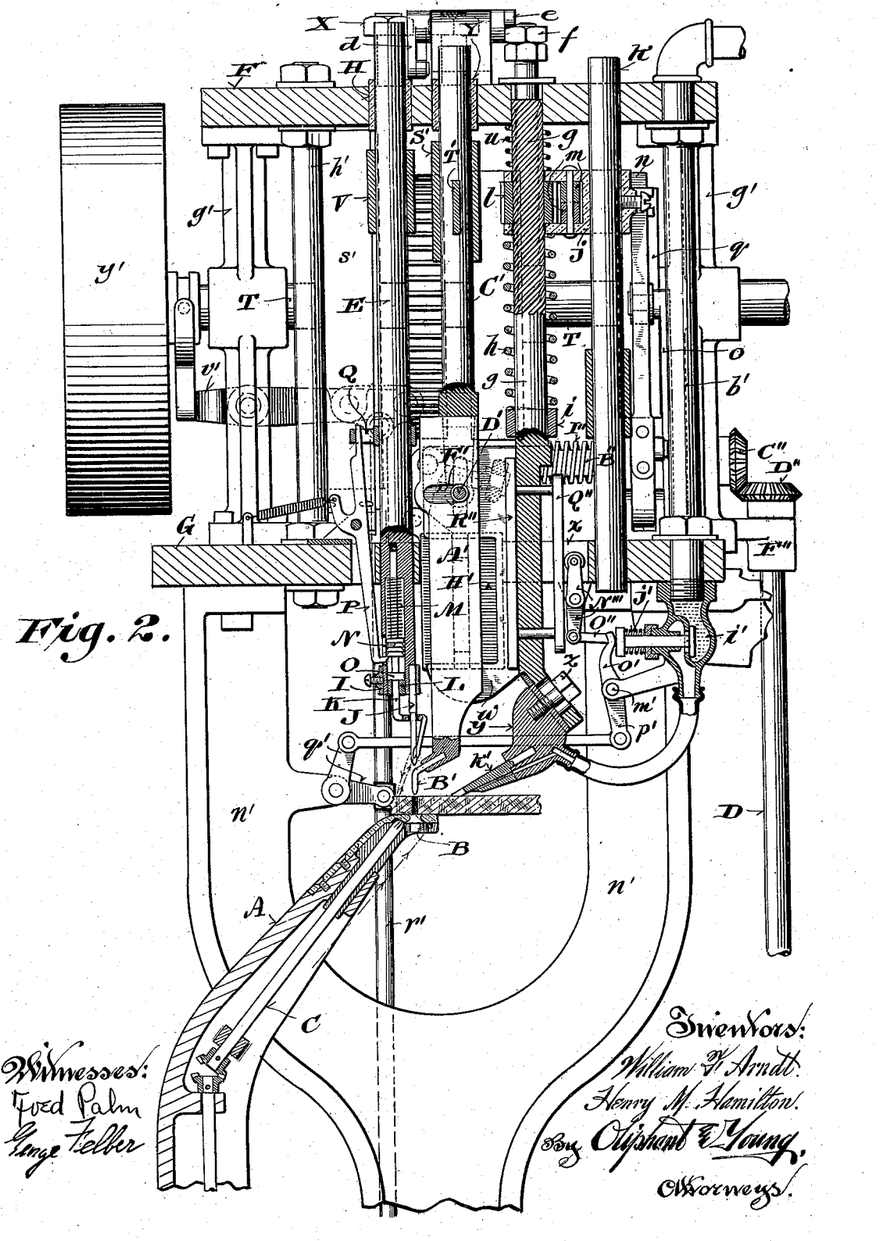
Fig. 2, a similar view of the complete head, with parts broken away and in section, as indicated by line 2—2 of Fig. 4.
Figure 3:
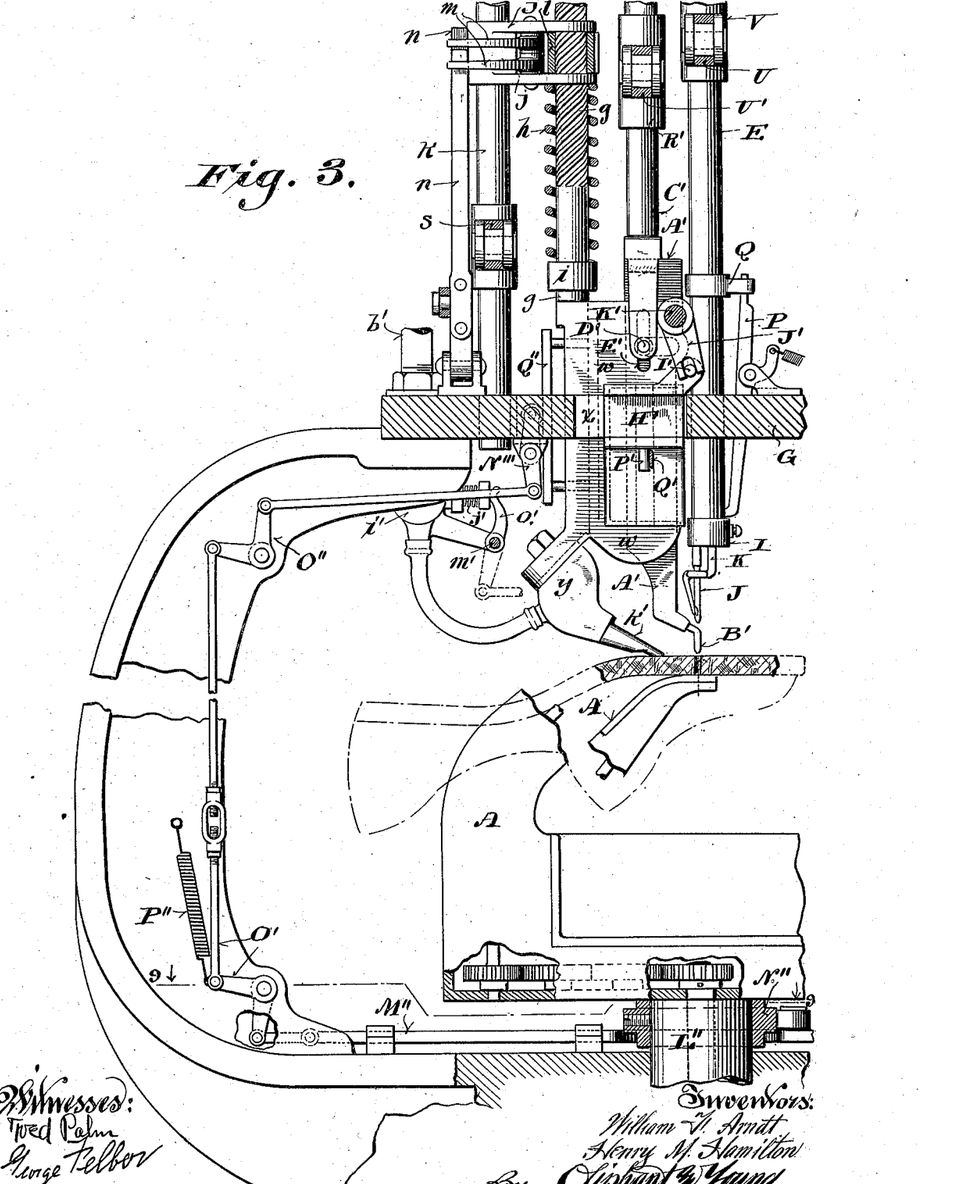
Fig. 3, a detail rear elevation of a portion of the head and horn, with parts broken away and parts in section, as indicated by line 3—3 of Fig. 4.

Referring especially to Figs. 2 and 3 of the drawings, A indicates a work-supporting horn provided with the usual whirl B, which whirl is driven by a shaft C in gear-connection therewith. Said shaft C receiving its motion by a system of gears and counter-shafts, from vertical driven shaft D located at the back of the machine. A needle-bar E having its bearings in upper and lower bed-plates F, G, constituting a head is located above the whirl. The upper bearing of the needle-bar being provided with a suitable spring pressed friction block H, the tension of which is sufficient to sustain the bar in suspension when not acted upon by a positive force. The lower end of the needle-bar E, is provided with a clamping-ring I, into which is gripped a needle J, and said bar at this end is also bored for the reception of the shank K of a cast-off that is formed with an off-set, having an opening through which the needle passes, the end of said cast-off being arranged to rest upon and cover the barbed opening of said needle when the latter is at the uppermost point of its stroke. The shank K of the cast-off has its upper bearing in a reduced portion of the bored opening of the needle-bar, and a lower bearing in a plug L that is threaded into the end of the bore of said bar. A coil-spring M surrounds the shank K and is interposed between the shouldered base of said bored-opening, and a corrugated collar N fast on said shank, there being another collar O secured to the latter, which collar rests upon the plug L, and serves to limit the downward motion of the cast-off with relation to the end of the needle.

Figure 6:
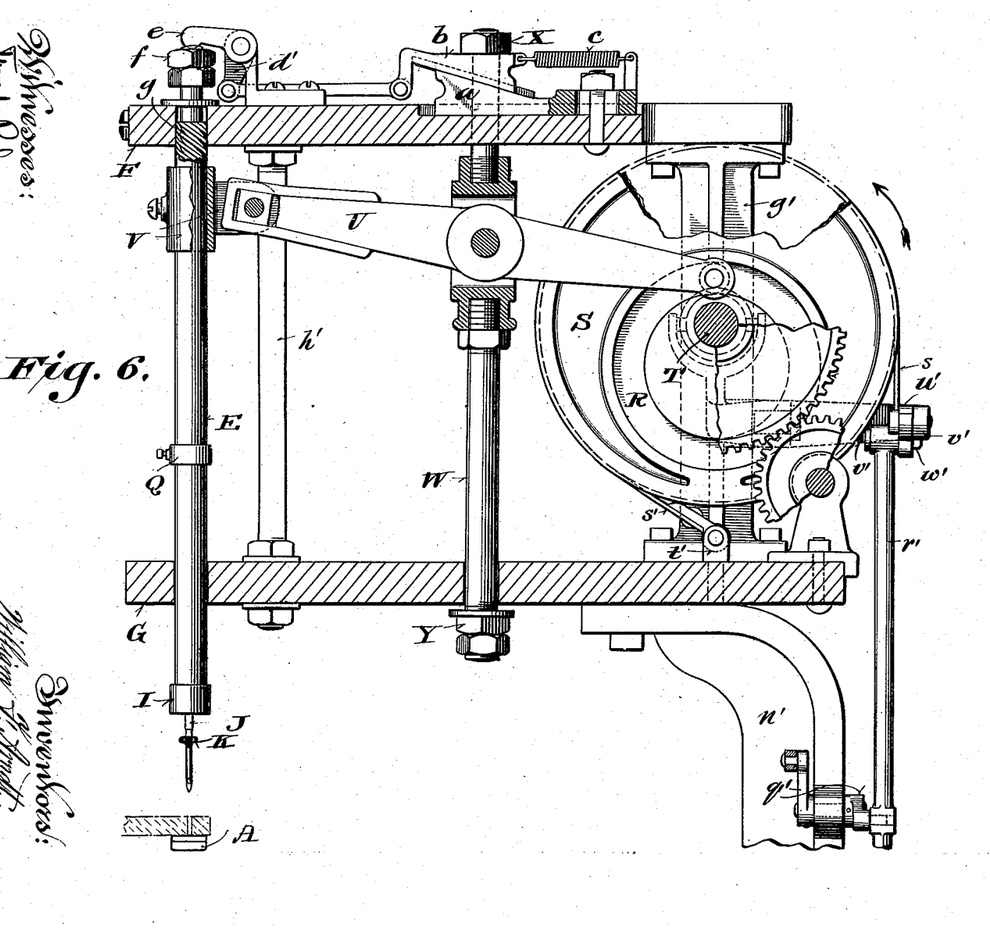
Fig. 6, a similar section view upon the plane as indicated by line 6—6 of Fig. 4.

As in similar machines of this class, the stroke of the needle is proportioned to the thickness of the leather being sewed, the variations in said stroke being attained by lifting the needle a greater or less height from the whirl, in order that the loop of thread carried by said needle be proportioned to the thickness of said leather. It is also necessary to provide means by which the point of the cast-off will always rest over the opening in the barb end of the needle at any elevation that the same may stop when raised, the cast-off when in position mentioned, being provided with mechanism whereby it is held momentarily in its descent as the needle advances to its work, in order that the thread-loop may be freed from said needle. With this end in view, a spring-controlled trigger P, is pivoted to the bed-plate, having a depending arm that terminates in a hooked-end, which end enters a slot in the needle-bar, and engages one of the corrugations of the collar N, depending upon the elevation said needle-bar is lifted. When the needle-bar starts on its descent, the trigger will hold the cast-off under its spring-tension, until a trip-collar Q engages an offset on the tail of said cast-off at which time the latter will drop until its collar O abuts the plug L. The needle-bar which carries the trip-collar Q and cast-off, will then travel downward until the latter strikes the leather being sewed. The cast-off in this position holds the thread-loop while the needle advances through the leather to the whirl and receives the thread for the next loop. Motion is imparted to the needle-bar by an eccentric cam-groove R of a band-wheel S that is fast on a power-shaft T, the motion being transmitted to said bar by a walking-beam U having a roller at one end in engagement with the cam-groove, and connected at the opposite end to the needle-bar by means of a clip V, as shown in Fig. 6 of the drawings.

The walking-beam U is fulcrumed in a stirrup that is coupled to and forms part of a stay-rod W, which rod has its bearings in the upper and lower bed-plates F, G, respectively, and is capped with nuts X, Y, at its ends, above and below the top and bottom faces of said plates. The stay-rod W is arranged to have a slight vertical lost motion, sufficient to change the position of the fulcrum of the walking-beam in order that the throw or stroke of the needle-bar may be varied. This provision is common in the class of sewing-machines of the type shown, as is also certain mechanism in connection with the presser-foot bar for regulating the amount of lost motion of the stay-rod W, whereby the stroke of the needle is varied. Our invention however contemplates a simple, effective and novel means for transmitting the motion from the presser-foot, whereby the lost-motion desired is accurately and positively adjusted. The said mechanism consists of a pair of oppositely inclined faced blocks a, b, that are arranged under the nut X of the stay-rod W, the block a being held in fixed adjustment to the upper bed-plate, while block b is in dove-tail connection with the fixed block a and slidably adjustable upon its inclined face. A coil-spring c is secured to a pin upon the block a and an ear at the back of the adjustable block b, which spring tends to draw said block b backward and decreases the height of the block members, thereby increasing the limit of throw or lost-motion of the stay-rod, by reason of the increased distance between the upper face of block b and the nut X of said stay-rod.

Figure 1:
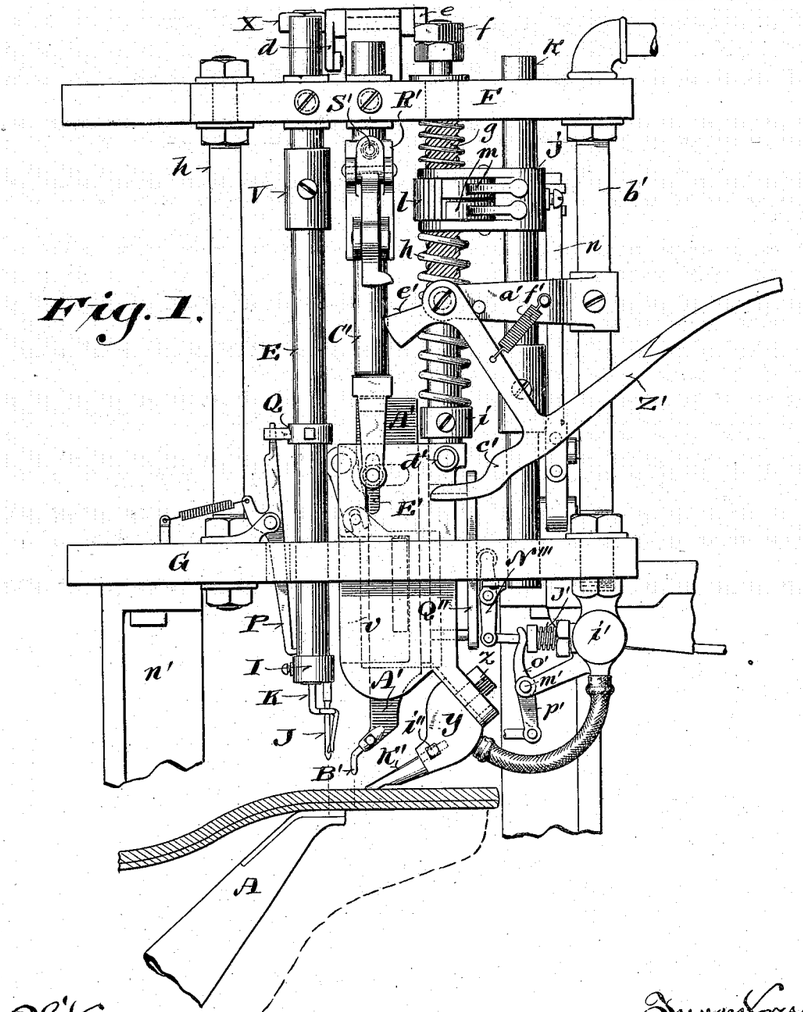
Figure 1 represents a front elevation of a portion of a sewing-machine head embodying the features of our invention, together with the work-supporting horn.
Figure 7:
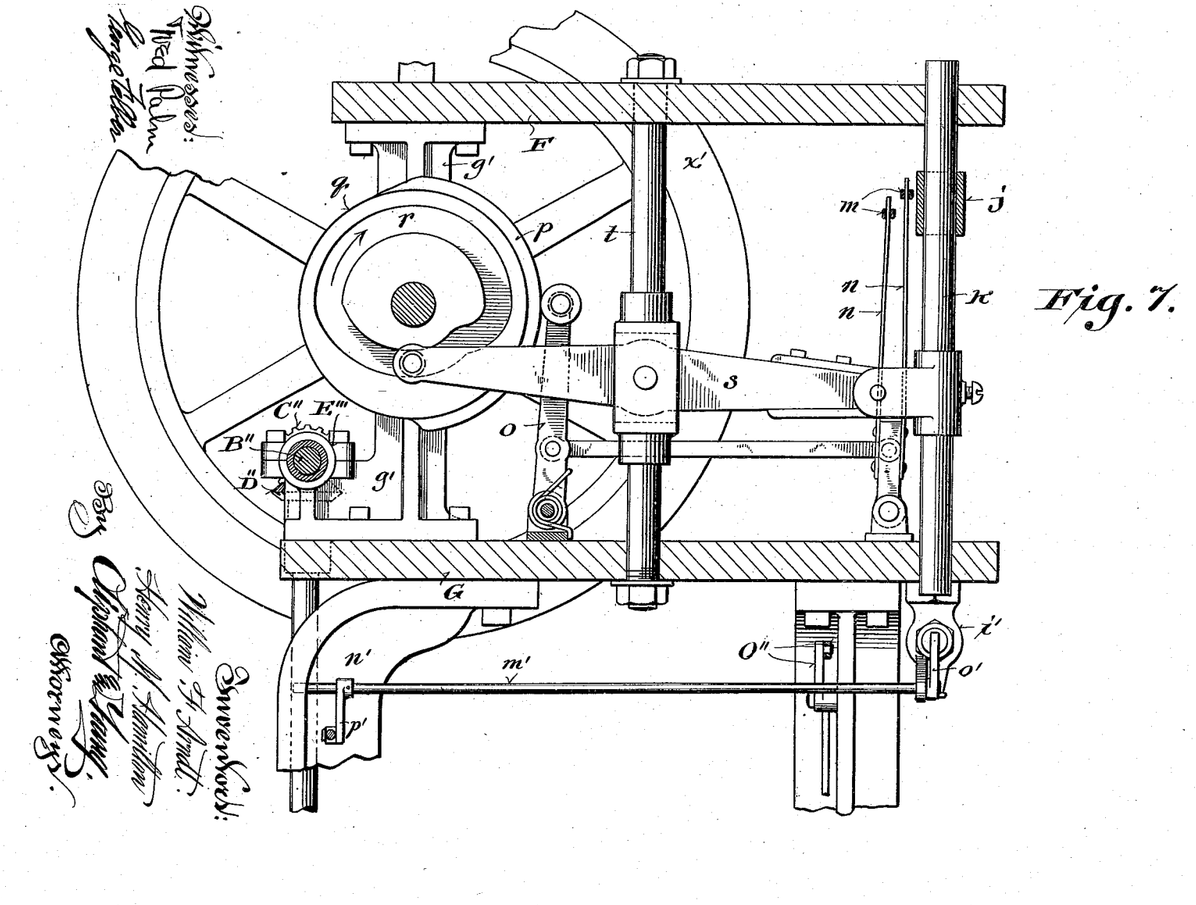
Fig. 7, another longitudinal sectional view, with parts broken away and parts in section, as indicated by line 7—7 of Fig. 4.
Figure 8:
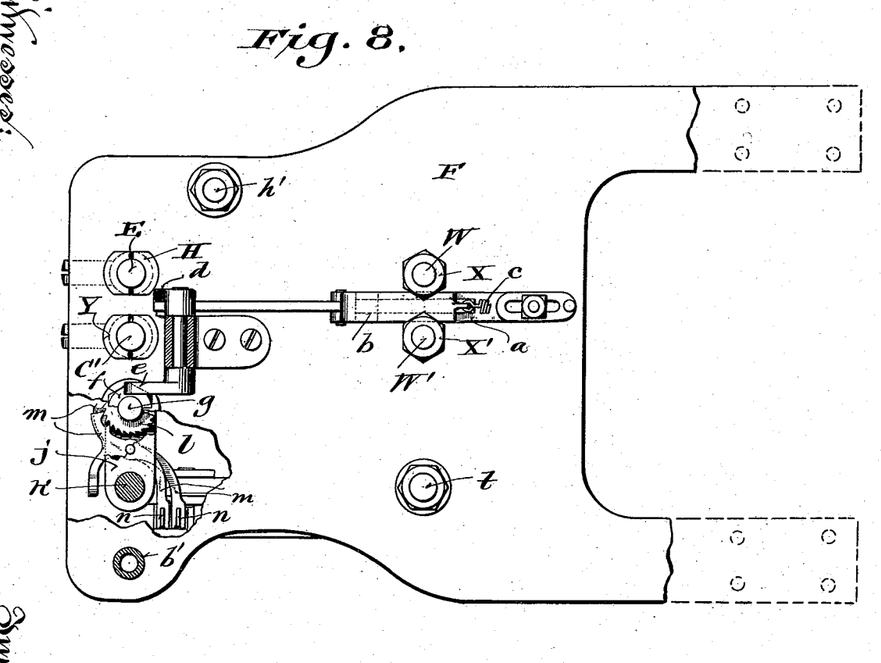
Fig. 8, a detail plan view of the upper head-plate, with parts broken away and in section, illustrating the automatic vertical stroke-adjustment mechanism of the awl and needle bars.

A bell-crank lever is mounted in a bracket upon the upper bed-plate having an arm d in link-connection with the forward end of the block b, and the other arm e of the bell-crank extends over and rests upon a nut f that is threaded upon a presser-foot bar g. The said bell-crank operates in opposition to the spring c and when the presser-bar is lifted motion is thereby imparted to the aforesaid bell-crank to correspondingly decrease the play of the stay-rod, by reason of the changed position of the block b. Thus the greater the thickness of leather, that is placed under the presser-foot, the less the throw of the stay-rod, the result of which action is a corresponding increase in the stroke of the needle, or vice versa. Referring to Figs. 1, 7, and 8, the presser-foot bar g is held against the work by the usual spring h interposed between a set-collar i and a spanner j, which spanner is fast to a lifting rod k, and is provided with arms between which is interposed a ratchet faced nut l in engagement with a quick threaded portion of the bar g. The nut l is locked against rotation, when it is desired to lift the presser-foot by means of dogs m, m, which dogs are pivoted between the spanner-arm with staggered faces for engagement with the ratchet-face of the nut. These dogs have slotted tails into which are fitted flat springs $n$, $n$, that are carried by a pivoted block in link-connection with a spring-controlled rock-arm $o$ having a roller in engagement with a peripheral-cam $p$ of a cam-wheel $q$, that is fast on the power-shaft T. The cam-wheel $q$ has an internal cam-track $r$ that is engaged by a roller upon one end of a walking-beam $s$. The opposite end of the walking-beam is clipped to the lifting-rod $k$, with its central point fulcrumed in a stirrup of a fixed rod $t$, which rod is fast in the upper and lower bed-plates, as best shown in Fig. 7 of the drawings. The working-surfaces of the cam-wheel $q$ are so formed and timed, so that the springs $n$, $n$, will cause the dogs to lock the nut $l$ at the proper time with relation to the cam-actuated walking-beam, so that the latter will lift the presser-foot bar while the work is being fed.

The delicate spring $u$ that is interposed between the spanner and face of the upper bed-plate serves only as a take-up to hold the lifting-rod and connected parts against lost motion. If the dogs $n$, $n$, should be locked when it is desired to lift the presser-foot by hand, they may be released from engagement with the nut by the forward thumb-extensions, as best illustrated in Fig. 8 of the drawings.

The novel feature of the described presser-foot bar mechanism, consists in the arrangement of springs in connection with the dogs $n$, $n$, and the mechanism for operating the same, the locking and release of the bar in itself being common in the art. The upper end of the presser-foot bar $g$ projects through the upper bed plate as before mentioned, and is capped by the nut $f$, and the lower portion of said bar is formed with forwardly extending wings $v$, $w$, which are guided in and pass through a slot $x$ in the bottom bed-plate G, the bar-portion proper, or backbone of said presser-foot being flared and slotted at its lower extremity for the reception of a presser-foot $y$ that is adjustably secured thereto by a bolt $z$. Mounted between the wings of bar $g$ is a flat awl-head A', which carries an awl-point B', that is fitted into the lower end of the head and held therein by a suitable set-screw. The awl is arranged to have vertical and horizontal reciprocative motion independent of the presser-foot, its first movement being downward to pierce the work upon the horn, it remains upon this plane until it completes a horizontal motion forward to feed the work, bringing the awl directly under and in alinement with the needle, the said awl then lifts at a right-angle to its previous elevation, so as to retract from the work, in which position it quickly drops back upon a horizontal plane to its vertical starting point, where a vertical lift takes place to complete the cycle preparatory to another plunge into the leather and so on, the last rise of the aforesaid awl being simply for the purpose of imparting momentum thereto before entering the work.

Vertical motion of the awl is imparted thereto by a plunger C', which is guided in the upper bed-plate, its lower end terminating in a forked head that straddles the wings $v$, $w$, of the presser-foot. The ends of the fork are connected by a pin D' that passes through vertical slots E' in said wings, and also through a horizontal slot F' in the awl-head A', there being a roller-sleeve fitted to said pin between the wings and arranged to contact with the faces of the last mentioned slot.

Figures 5, 10, 11, 12:
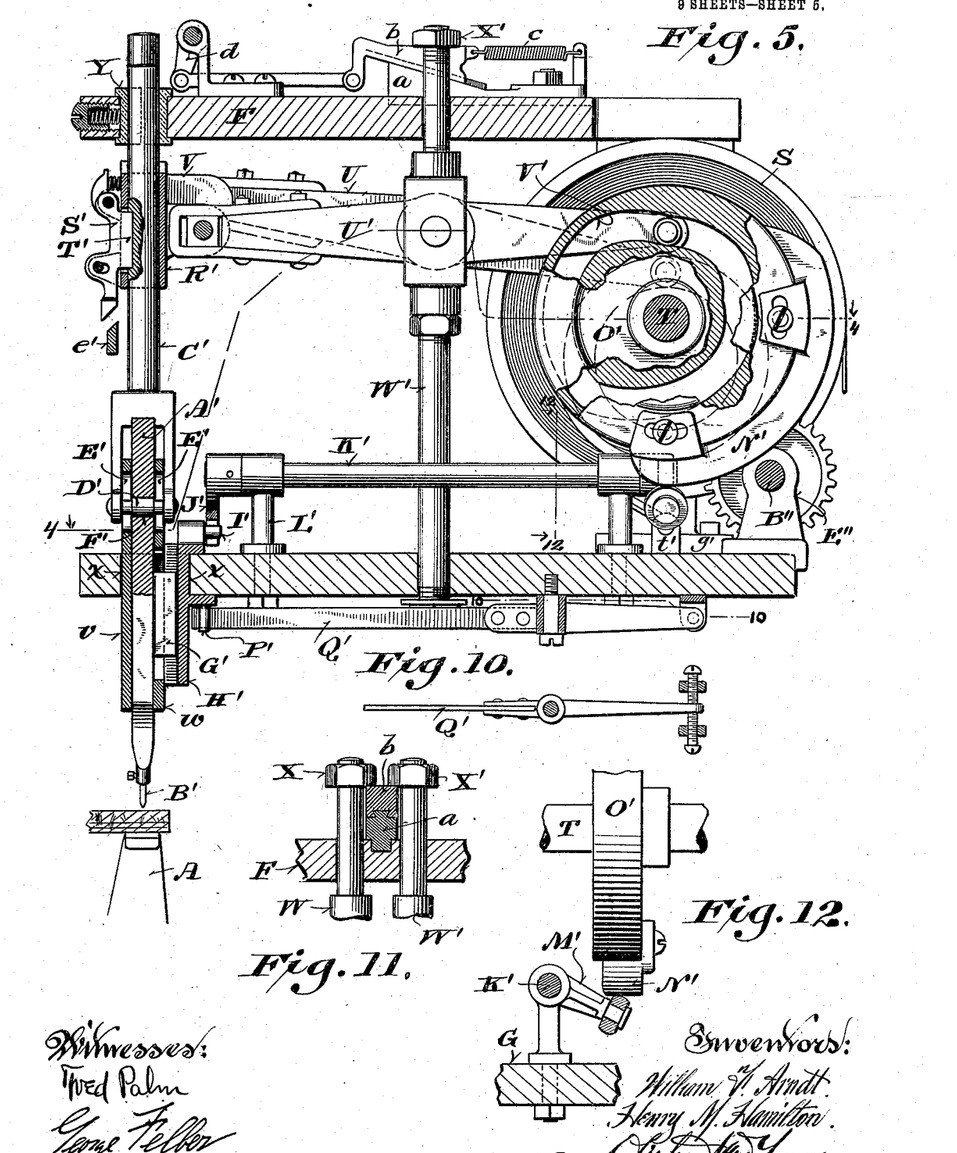
Fig. 5, a longitudinal sectional view of the same, with parts broken away, the section being indicated by 5—5 of Fig. 4.
Fig. 10, a detail section of a spring tension adjustment, as indicated by line 10—10 of Fig. 5.
Fig. 11, a detail cross-section of a pair of inclined feed-blocks for automatic adjustment of the vertical stroke of the awl and needle bars, said bars being shown in their relative positions and partly broken away.
Fig. 12, a detail sectional view, on line 12—12 of Fig. 5, showing the cam-actuating mechanism for horizontal reciprocation of the awl.

The rear side of the awl-head A' is formed with a vertical rib G', which extends beyond the inner wing $w$ of the presser-foot and engages a groove in a horizontally reciprocative slide H', the said wing $w$ being cut away on three sides to permit both vertical and horizontal motion of the rib. The slide H' is of sufficient area to completely cover the cut-away portion of the wing $w$ against which one of its faces rest, while the opposite face thereof abuts a continuation of the slot $x$ formed in the lower base-plate for the reception of the presser-foot wing-extension, said slide being also provided with upper and lower lips which engage the faces of said base-plate. An ear projecting from the upper lip of the slide H' carries a pin I', that is straddled by the forked end of a crank-arm J', which crank-arm is fast on a rock-shaft K' having its bearings in brackets L' secured to the lower base-plate. The rock-shaft K' has secured to its rear end another arm M', which carries a roller that is arranged in the path of a detachable segmental cam-track N', secured to a cam-wheel O' fast on the power-shaft. A pin P' depending from the lower lip of the slide H', serves as a rest for a leaf-spring Q', which spring acts to hold said slide together with the awl-head backward, or in a position where the point of the awl is driven into the leather, the forward or horizontal feed of the awl being obtained through the cam-actuated rock-shaft K' operating in opposition to the spring. The spring Q', as shown in Figs. 5 and 10, is fast on an arm pivotally connected to the underside of the bed-plate G, tension of the spring being controlled by set-screws engaging the arm and in threaded-connection with the ears depending from said bed-plate.

By reason of the slot F' in the awl-head, reciprocative motion is imparted thereto without interfering with the horizontal feed of said awl-head, the latter being confined between the awl-head wings, and guided in its vertical reciprocation by means of the rib G' fitted into the slot of slide H' as shown. The plunger C' is provided with a ferrule R' that carries a pivoted spring-pressed dog S', which dog has a tongue T' that engages a groove in said plunger for the purpose of locking the same to the ferrule. A walking-beam U' is connected to ears of the ferrule having a roller at its rear end, that is fitted into a cam-groove V' of the cam-wheel O', by means of which groove reciprocative motion is imparted to the plunger, and from thence transmitted to the awl. The said walking-beam U' is suitably fulcrumed in a stirrup of a stay-rod W' that has a similar lost-motion provision as that of the described needle-bar stay-rod W, whereby the stroke of the awl is regulated simultaneous with the needle-bar stroke, by means of the sliding-blocks $a$, $b$, previously described, the said blocks being directly under a nut X' of the walking-beam stay-rod W', as best shown in Figs. 5, 8, and 11 of the drawings. The upper bearing of the plunger C' has a similar spring-tension split-box Y' to that mentioned in the needle-bar description and for the same purpose mentioned therein.

In order to lift the presser-foot, when work is to be inserted between the latter and the horn and also to lift the awl at the same time, if said awl is down, we have provided a hand-lever Z', which, when swung down, is so arranged as to lift both the presser-foot and awl-head with one operation should they both be in a position to require it. The hand-lever Z' is pivoted to a bracket $a'$ that is secured to a pipe $b'$. The lower end of this lever is formed with a cam-faced hook $c'$ that serves to lift a roller $d'$ on the face of wing $u$ of the presser-foot, and a radial blade portion $e'$ of said lever extends from its fulcrum for engagement with the tail of the ferrule-dog S', as shown in Figs. 1 and 5.

The hand-lever is normally held by a spring $f'$ against a stop on the bracket $a'$, and when pressed down by the operator it will first cause the blade-portion thereof to unlock the dog S' from the plunger C', the incline face of the hook $c'$ will then act upon the roller $d'$, causing the presser-foot together with the awl-head and its parts to be lifted, either for the purpose of inserting or replacing work in the machine. The upper and lower bed-plates are spaced apart and braced by rear shaft hangers $g'$, and a stay-rod $h$ and the pipe $b'$ at the front of the machine, said pipe serving as a conductor for water to be fed from the presser-foot to the channel of the shoe-sole being sewed. Fitted to the lower end of pipe $b'$ is a valve $i'$ that is held closed by a spring $j'$, the nozzle of the valve being connected to a duct in the presser-foot by a flexible hose. The presser-foot duct is registered with an opening in a finger $k'$, the shank of which finger is socketed and held in the presser-foot by means of a set-screw $i'$. By the above construction when the valve is opened, a small stream of water is fed to the leather in the line of stitch directly under the finger, thereby moistening the leather only at the location where it is necessary to soften said leather to facilitate the awl in its work, this being particularly desirable in order to avoid the ill consequence of wetting the entire sole before placing it in the machine, which results in frequent warping of the work and damage to the finished product, if the same is not reformed. In order that the stream of water may be automatically turned upon the work when the machine is put in motion, a bell-crank lever is provided, having its fulcrum rod $m'$ mounted in an ear of the valve-casing and rear leg $n'$ of the frame, and arm $o'$ of the bell-crank being arranged to oppose the spring-controlled valve-stem. The lower arm $p'$ of said bell-crank is in link-connection with another bell-crank $q'$, which bell crank is pivoted on the rear frame-leg $n'$, and connected to a clutch-rod $r'$, the said rod being forced upward to start the machine, and downward to stop the same by the usual foot lever-mechanism not shown in the drawings.

In Fig. 2, of the drawings, the machine is shown at rest, and when the clutch-rod $r'$ is forced upward, it is apparent through the above described bell-crank connections with the water-valve, the same will be opened to admit water to the work. It is obvious however that any form of lever-connection to the starting-clutch and water-valve may be employed to accomplish the same result without departing from the spirit of our invention.

Figures 4, 13:
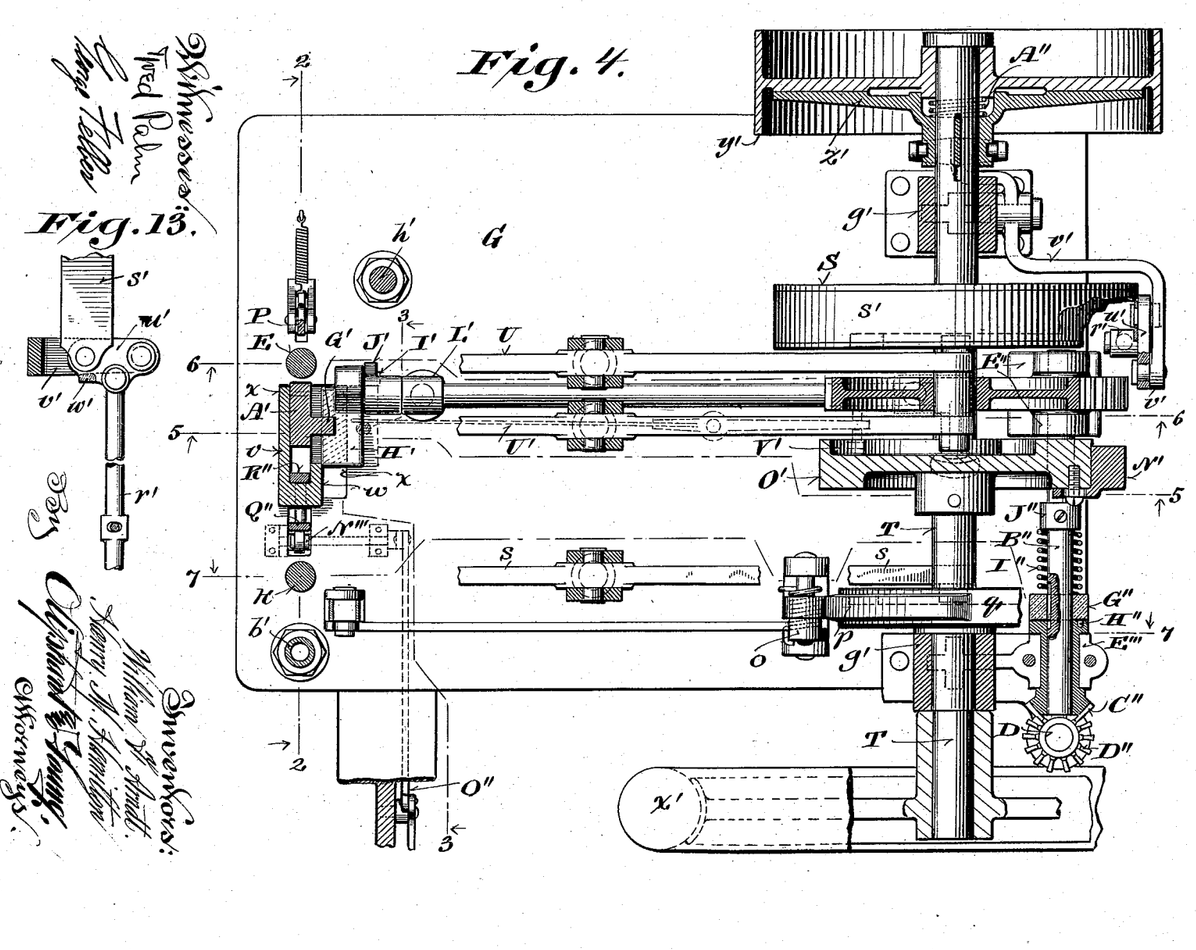
Fig. 4, a plan view of the machine, as indicated by line 4—4 of Fig. 5.
Fig. 13, a detail view of a band-break mechanism.

In practice it has been found desirable at all times to stop machines of this class instantly, and in instances great annoyance is encountered caused through overthrow, after the clutch-mechanism has been released. To overcome this defect we employ a friction-brake in connection with a clutch whereby the brake is automatically set with the clutch-release, said brake-mechanism being as follows:

The band-wheel S is provided with a countersunk face for the reception of a metallic band $s'$, one end of which is connected to the lower base-plate by a clip $t'$, the opposite end thereof being secured to a link $u'$, which link is pivoted to the end of a clutch-lever $v'$, that is fulcrumed upon one of the shaft-hangers $g'$, as best shown in Fig. 4 of the drawings. The link $u'$ has a lip $w'$ extending under the clutch-lever $v'$, which lip serves to limit the independent upward movement of said link when the latter is actuated by the clutch-rod $r'$ that is connected thereto. The power-shaft T at one end carries a hand-wheel $x'$, and loosely mounted upon the opposite end is a driving-pulley $y'$ having a friction-face against which a disk $z'$ is adapted to be forced by the clutch-lever. The hub of this disk is splined upon said power-shaft, and has an annular groove for the reception of the spannered end of said clutch-lever, there being a spring A″ interposed between a recessed end of the hub and adjacent face of the driving-pulley y′ whereby, when the aforesaid clutch-lever acts to release the clutch-members, said spring assists to quickly disengage the same. With the above described arrangement, should the operator draw down the clutch-lever r′, it will cause the band s′ to grip the band-wheel S simultaneously exert a pressure on the cutch-lever (through the link u′) to disengage the disk z′ from the friction-face of the driving-pulley, which action immediately stops the machine. The power-shaft T is journaled in the hangers g′ and imparts motion to the vertically disposed whirl drive-shaft D through gear-connection to a counter-shaft B″, that in turn is geared to the shaft D by miter-gears C″ D″. The shaft B″ is journaled in bearings E″, E″ fast on the lower bed-plate, the bearing E‴ of which shaft forms part of one of the hangers g′, said hangers being also formed with a bearing F″ for the shaft D, as shown in Fig. 2 of the drawings.

In order to provide means whereby the whirl-drive may be automatically thrown out of gear, in case said whirl should be choked by a lasting tack or the like, we have provided a stop clutch-mechanism that is carried by the counter-shaft B″. Said mechanism consists of a collar G″ that is splined upon the shaft B″ having a pin H″, that is adapted to socket in an indenture in the face of a sleeve-extension of the miter-gear C″, which gear is loose on said shaft B″ and held against lateral play by means of a reduction in its sleeve-extension said extension being adapted to rotate in the bearing E‴, as shown. A coil-spring I″ encircles the shaft B″ and serves to hold the pin of collar G″ in engagement with the indenture of the sleeve, said spring-tension being regulated by a set-collar J′ that is adjustable upon the said counter-shaft. The tension of the spring is such, that under normal conditions the splined collar will impart motion to the gear C″, but should there be a sudden choke of the whirl as stated, the spring will permit the slip clutch-mechanism to act, and thus prevent motion from the counter-shaft being imparted to said whirl.

Figure 9:
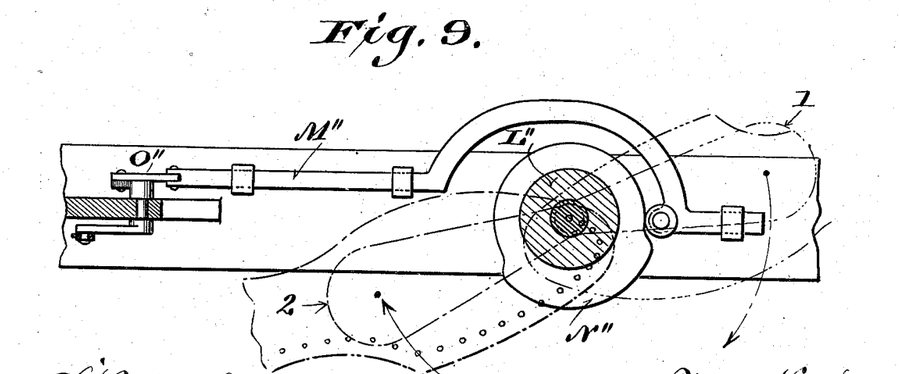
Fig. 9, a plan sectional view of the frame and horn spindle, showing the cam-mechanism for automatically controlling the length of stitch while sewing around the toe-portion of a sole, the section being indicated by line 9—9 of Fig. 3.

Automatic means for shortening the length of stitch around the toe of a shoe-sole, is best shown in Figs. 3 and 9, which means comprises a cam N‴, that is secured to the spindle L″ of the horn A, said cam being provided for the purpose of imparting motion to slide M″ that is reciprocative in guides of the forward frame-leg of the machine, the slide having a roller at its end arranged in the path of the aforesaid cam. Motion of the slide is transmitted to a lever N‴ by a series of connecting links and bell-cranks O″, there being a spring P″ in connection with one of the bell-cranks for holding the roller of the slide M″ against the face of the cam. The lever N‴ is pivoted in ears below the lower base-plate G and extends upward into a pocket of the slot x thereof. A roller of this lever engages a strip Q″ that is supported by dowels extending through openings in the back-bone of the presser-foot bar, said dowels being connected to a plate R″, which plate is laterally slidable between the wings v, w, of said presser-foot.

The operating position of the cam N″, is so arranged with relation to a line drawn the axis thereof and the horn, that when the point is reached where the shoe is turned to sew around the toe, the horn in swinging from its starting position, as indicated by 1 in Fig. 9, will cause the cam to act upon the slide M″ and through its connection to the lever N‴ cause the same to press the plate R″ forward and thereby block the full return-stroke of the awl-bar, until such time as the horn has come to a position where it remains while the sole is being completely sewed, said position being that indicated by 2 in Fig. 9. Thus the stitches are shortened by reason of the shortened feed-stroke of the awl, which stroke when desired may be permanently regulated for various work by replacing the cam-track segment N″ for one of a greater or less circumferential diameter.

Figure 14:
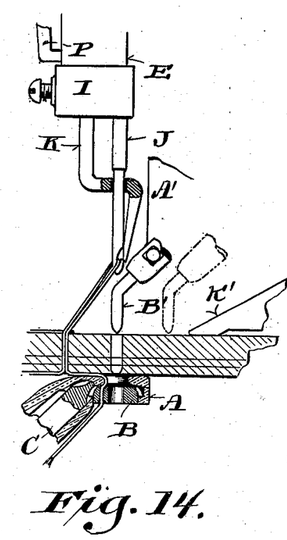
Figs. 14, 15 and 16, are detail sectional views illustrating the various positions assumed by the needle and awl while forming a stitch.
Figure 15:
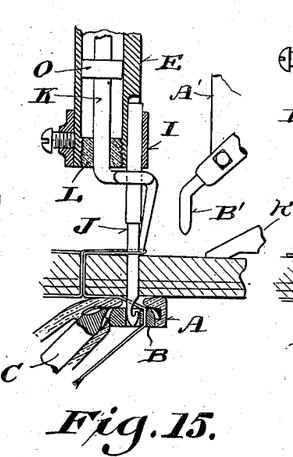
Figure 16:
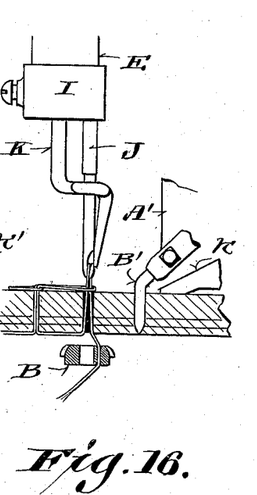

Having described the machine in detail, the operation of forming a stitch, as best shown in Figs. 14, 15, and 16, is similar to well known machines of the loop-stitch variety, except that in the present machine the feeding is accomplished by an awl that passes through the leather close to the presser-foot, moves forward together with the shoe-sole and retracts therefrom directly in line with the needle, leaving an aperture in the leather through which said needle passes, thus relieving the same of all strain. It is understood that the presser-foot may be adjusted up to a position so that it just clears the awl in its descent, and that the actuating-cam of said presser-foot is of such contour as to lift the same when the leather is being fed to the needle. The spring release-mechanism that operates on the nut upon the threaded shank of the presser-foot is so timed as to give an increased pressure upon the leather as the awl is withdrawn therefrom.

We claim:

1. In a sewing-machine having a reciprocative needle and work-supporting horn, the combination of a spring controlled presser-foot, automatic means for lifting the presser-foot at timed intervals, wings extending from the presser-foot bar, a slotted awl-bar fitted between the wings, a horizontally reciprocative block in connection with the awl-bar, and a vertically reciprocative plunger in engagement with the awl-bar slot.

2. In a sewing-machine having a reciprocative needle and work-supporting horn, the combination of a spring-controlled water-feed presser-foot, automatic means for lifting the presser-foot at timed intervals, wings extending from the presser-foot bar, a slotted awl-bar fitted between the wings, a horizontally reciprocative block in connection with the awl-bar, and a vertically reciprocative plunger in engagement with the awl-bar slot.

3. In a sewing-machine, a reciprocative needle, a reciprocative work feeding mechanism, and a rotative work supporting horn; the combination of a cam rotative with the horn, and mechanism connecting the cam and reciprocative work feeding mechanism, whereby the stroke of said feed-mechanism is regulated relative to the position of the horn.

4. In a sewing-machine, having a reciprocative needle and work-supporting rotative horn, the combination of a spring-controlled water-feed presser-foot, automatic means for lifting the presser-foot at timed intervals, wings extending from the presser-foot bar, an awl-bar fitted between the wings, a horizontally reciprocative block in connection with the awl-bar, a horizontal slot in said awl-bar, a vertically reciprocative plunger in engagement with the slot, a movable plate interposed between said wings in the path of travel of the awl-bar, a cam mounted on the work-supporting horn, and means in connection with the cam and plate whereby the position of the latter is changed when the horn is moved to a predetermined point.

5. In a shoe-sewing machine, upper and lower bed-plates, a spring-pressed presser-foot bar guided in the upper bed-plates, means for regulating the spring-pressure of the presser-foot, means for lifting said presser-foot at timed intervals, wings provided with vertically disposed slots extending from the presser-foot bar, a guide for the wings in the lower bed-plate, an awl-head provided with a horizontally disposed slot fitted between the wings, a pin in engagement with the awl-head and wing-slots, a plunger secured to the pin exterior of the wings, an opening in one of the wings, a rib extending from said awl-head through the opening in the wing, a reciprocative block guide in the lower bed-plate, and a vertically disposed groove in the block into which the rib of the aforesaid awl-head is fitted.

6. In a sewing-machine having a reciprocative needle-bar and a reciprocative awl-bar, oscillatory walking-beams for driving both of the bars, adjustable fulcrum-rods for the walking-beams, an adjustable presser-foot bar, a bell-crank having one arm thereof arranged to be opposed by the presser-foot bar, a stationary-block having an inclined upper face, a slidable block having a lower inclined face fitted upon the upper face of the first named block, said block being arranged to engage the needle and awl-bars, and means connecting the sliding block and one arm of the bell-crank, whereby the stroke of both the needle and awl-bars is relatively changed.

7. In a sewing-machine, the combination of stationary bearings, a needle-bar having vertical reciprocation in the stationary bearings, a needle secured to the bar, a cast-off in slidable contact with the needle, a spring-controlled presser-foot, a horn-supported whirl in alinement with said needle, an awl-bar, an awl secured to the bar, cam-controlled means for imparting vertical reciprocation to the awl-bar, other cam-controlled means for imparting horizontal reciprocation thereto, whereby the awl and work are brought in register with and under the needle, the awl being thereafter withdrawn to permit said needle to enter the aperture in the work made by said awl, and mechanism in connection with the spring-controlled presser-foot, whereby vertical reciprocation of the needle-bar and awl-bar are relatively regulated.

8. In a sewing-machine having a reciprocative needle, a rotative work-supporting member and a reciprocative work-feeding mechanism; the combination of a cam secured to the member, and mechanism in connection with the cam and reciprocative work-feeding mechanism, whereby the stroke of the feed-mechanism is regulated.

9. In a sewing-machine having a reciprocative needle and a rotative work-supporting horn; the combination of a spring-controlled slotted presser-foot, automatic means for lifting the presser-foot at timed intervals, wings extending from the presser-foot bar, an awl-bar fitted between the wings, a horizontally reciprocative block in connection with the awl-bar, a vertically reciprocative plunger in engagement with the awl-bar slot, a movable plate interposed between said wings in the path of travel of the awl-bar, a cam secured to the work-supporting horn, and means in connection with the cam and plate, whereby the position of the latter is changed.

10. In a sewing-machine having a reciprocative needle and a work-supporting horn, a spring-controlled presser-foot, and automatic means for lifting the presser-foot at timed intervals, the combination of wings extending from the presser-foot, a slotted awl-bar fitted between the wings, a horizontal reciprocative block in connection with the awl-bar, means for imparting reciprocation to the block a horizontal slot in said awl-bar a vertically reciprocative plunger in engagement with the awl-bar slot, and means for imparting vertical reciprocation to the plunger.

11. In a sewing-machine having a reciprocative needle-bar, a reciprocative awl-bar, oscillatory walking-beams for driving both bars, adjustable fulcrum-rods for the walking-beams, and an adjustable spring-controlled presser-foot bar; the combination of a slidable block in connection with the adjustable fulcrum-rods, and means in connection with the presser-foot bar, whereby the position of the slidable block is changed to regulate the adjustment of both of said fulcrum-rods.

In testimony that we claim the foregoing we have hereunto set our hands at Milwaukee, in the county of Milwaukee and State of Wisconsin in the presence of two witnesses.

WILLIAM F. ARNDT.
HENRY M. HAMILTON.

Witnesses:
GEO. W. YOUNG,
FRED PALM.